United States Patent [19]

Lazarus

[11] Patent Number: 4,961,639

[45] Date of Patent: Oct. 9, 1990

[54] PRISM SECTION LENS SPECTACLES

[76] Inventor: Stuart M. Lazarus, 58 Huntersfield Rd., Delmar, N.Y. 12054

[21] Appl. No.: 374,544

[22] Filed: Jun. 30, 1989

[51] Int. Cl.$^5$ .............................................. G02C 7/06
[52] U.S. Cl. ...................... 351/41; 351/170; 351/175
[58] Field of Search ............... 351/41, 158, 168, 170, 351/175

[56] References Cited

U.S. PATENT DOCUMENTS

| | | | |
|---|---|---|---|
| 1,144,853 | 6/1915 | Laisne . | |
| 2,057,066 | 10/1936 | Smith | 88/7.86 |
| 2,183,885 | 12/1939 | Heavyside | 351/170 |
| 2,594,698 | 4/1952 | Thomas | 88/1 |
| 2,817,332 | 12/1957 | Shlechter | 128/76.5 |
| 3,454,715 | 7/1969 | Larach et al. | 178/7.86 |
| 3,454,716 | 7/1969 | Larach | 178/7.86 |
| 4,647,165 | 3/1987 | Lewis | 351/59 |
| 4,781,452 | 1/1988 | Ace | 351/175 |

Primary Examiner—Paul M. Dzierzynski
Attorney, Agent, or Firm—Heslin & Rothenberg

[57] ABSTRACT

Spectacle lenses have upper and lower viewing sections, the upper section comprising a combined pair of prisms which refract light rays to angularly modify a line of sight from a viewer therethrough to an intermediate and elevated object, e.g., an item on a video display screen so that the item is perceived at a lower, laterally outward, and more distant position.

9 Claims, 2 Drawing Sheets

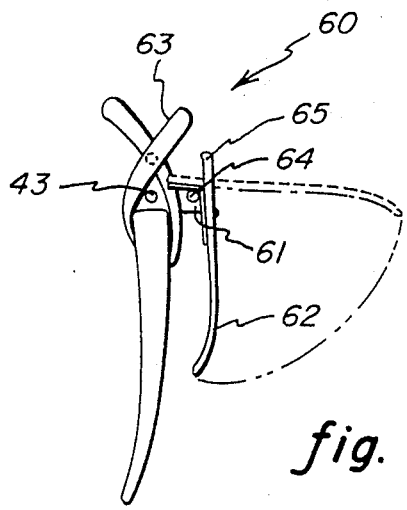
fig. 6
fig. 7
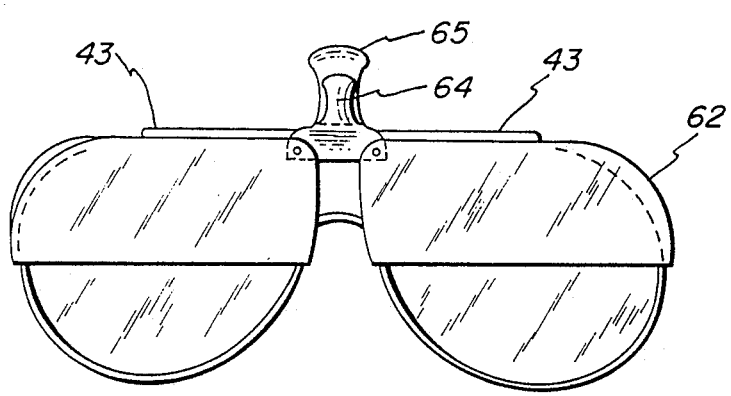

PRISM SECTION LENS SPECTACLES

Background of the Invention

This invention relates to a prism section lens for spectacles and, more specifically, to prism section lens spectacles for human wear and use which provide, by means of refraction of light passing through a dual prism combination section therein, a more conveniently oriented and angled line of sight to an object which is at an intermediate distance and straight ahead position from an observer.

An exceedingly large number of work places or stations in general business operations include a cathode ray tube, CRT, which displays pertinent graphic information on a visual screen. These devices are sometimes referred to as computer terminals or visual display tubes, VDT. A human observer at the noted work station may be in a seated position at a desk or work surface or may be in a standing position. In any event, the VDT is usually positioned so that the line of sight of the observer to the VDT is horizontal or straight ahead from the observer. However, for the normal human observer, the most comfortable and convenient line of sight for extended periods of close work is at an angle below the horizontal line of sight. Consequently where an observer is constantly required to view a VDT, discomforting eye and neck muscle stress and strain are encountered.

Among individuals who generally work with printed symbols in hard copy form, approximately 30% exhibit symptoms related to visual stresses of the task. If the same individuals or group are assigned to VDT tasks, visual stress related symptoms rise to about 60%. This significant increase is due primarily to visual factors associated with video displays and the spatial relationship of the display or screen with respect to the position of the observer.

Accordingly, there is a continuing need to relieve these VDT related stress conditions. Such relief may be in the nature of an observer's line of sight change. It has been discovered that a dual prism combination lens may be inserted between the observer and the VDT to relieve visual stress conditions without changing the physical location of the VDT or the observer.

Summary of the Invention

An optical lens for eyeglasses, spectacles and the like utilizes a pair of prisms in a dual prism combination section of the lenses. The dual prism combination section occupies a limited part or viewing section of each single lens in spectacles utilizing a spaced pair of lenses. Lenses having dual prism combination sections are positioned in appropriate spectacle frames in such a manner that an observer viewing an intermediate and straight ahead object through the dual prism combination section will perceive the object at a vertically lower and laterally displaced out position as well as at a more distant position. These features are obtained by means of the well known laws of light refraction in prisms which generate a visual image of an object, being viewed therethrough, which is displaced from the actual position of the object. The remaining part of the single lens is devoted to the usual lens curvatures which correct preexisting visual and/or focusing deficiencies.

This invention will be better understood when taken in connection with the following description and drawings.

Brief Description of the Drawings

FIG. 6 is a schematic representation of spectacles having clip-on lenses incorporating a dual prism combination section of this invention.

FIG. 7 is a frontal view of the FIG. 6 clip-on device bifocal lenses incorporating a combination dual prism section of this invention.

Description of a Preferred Embodiment

Figure 1:
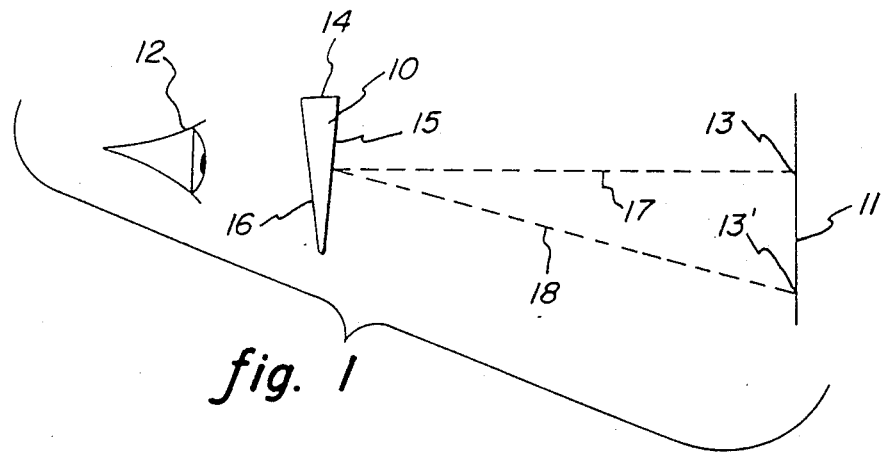
FIG. 1 is a schematic illustration of a plano prism lens which may be utilized to angularly modify a line of sight from an observer to a remote and vertically elevated object.
Figure 2:
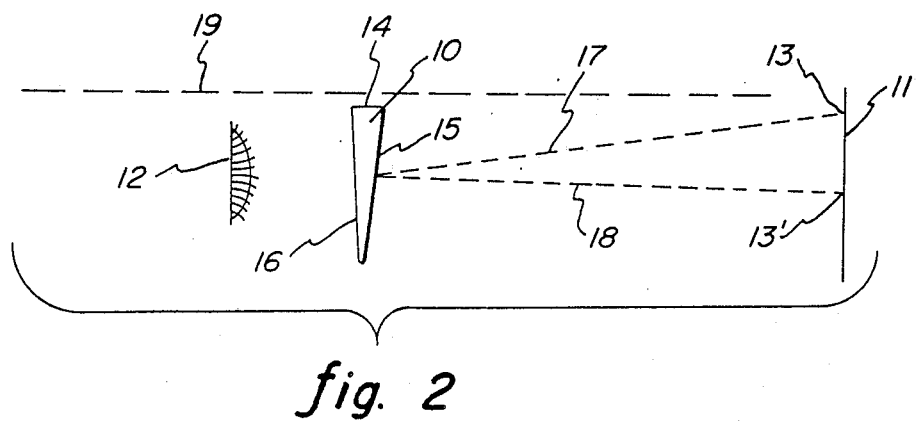
FIG. 2 is a schematic illustration of a plano prism lens used to angularly laterally modify a line of sight from an observer to a remote object.

FIGS. 1 and 2 are utilized primarily to illustrate the use of a prism lens to alter the angle of a line of sight from an observer to an object.

Referring now to FIG. 1, a simple plano prism lens 10 is illustrated as spaced from a viewing screen 11 and between an eye 12 of an observer and a graphic display item 13 on screen 11. Prism 10 comprises an upper base 14 from which a pair of front and rear surfaces 15 and 16 respectively, converge towards each other in a prism configuration. Ordinarily, assuming eye 12 is a normal human eye of an observer, the usual line of sight, without lens 10, from eye 12 to an object 13 on screen 11 is illustrated by dash line 17. However, with plano convergent prism lens 10 in the position shown, the well known laws of light transmission and refraction through prisms indicate that light rays passing through prism 10 are refracted at a predetermined angle so that the object 13 being viewed, is observed at 13' along view line 18. Prism lens 10 has made object 13 appear to be vertically lower, as seen at 13' in FIG. 1, as compared to its actual position 13. Light rays which project object 13 to prismatic lens 10 follow along line 17, but at lens 10 the rays are refracted to pass through lens 10 along horizontal dash line 18. Dash line 18 becomes the actual line of sight for eye 12 to observe the object 13 which, however, appears to the observer to be at 13'.

The result achieved is that there is no need to adjust eye 12 straight ahead or horizontal to view an object 13 on screen 11 when the screen or object thereon is positioned straight ahead (without prism lens 10) and above the normal viewing line 18.

By minimizing the need or extent of eye or head rotation for screen viewing, muscular tension of both neck and eye muscles is significantly reduced. Eye muscle tension may also arise from other VDT viewing practices. For example, a VDT observer at a work station will also utilize a converging movement of the eyes for close screen viewing and eye focusing in a converging pattern over an extended period of time also causes eye muscle strain. A prism lens may be employed to laterally displace the position at which an object is seen in much the same manner as described with respect to FIG. 1 but with the lens 10 rotated as shown in FIG. 2.

Referring now to FIG. 2, prism lens 10 is positioned between right eye 12 of an observer and screen 11. FIG. 2 represents a top view of an observer with eye 12 being the right eye and phantom line 19 representative of the observer's nasal plane. As noted in FIG. 1, base 14 of prism 10 extends in a horizontal direction slightly above eye 12. This arrangement is referred to as a base-up prism 10 and is central to the present invention. In FIG. 2 base 14 of prism 10 extends in a generally vertical direction adjacent eye 12, i.e., the prism 10 of FIG. 1 is rotated 90 degrees about its horizontal axis perpendicular to the plane of the prism surface 15. This arrangement is referred to as a base-in prism. The same rules which govern light transmission and refraction for FIG. 1 also apply to FIG. 2 and the observer perceives an object 13 at 13' which is laterally displaced outwardly from its original position at 13.

When both a base-up and base-in prism are employed in a combination form, a distant object is perceived to be at a position not only vertically and laterally displaced from the actual position, but also at a greater distance from the observer. Combined vertical and lateral displacement produced by combined prisms generates a resultant image which positions the perceived object at a greater distance from the eye of the observer. This greater distance lessens the angle of convergence otherwise necessary for a close up view of the object, and accordingly alleviates some of the eye muscle tension arising from eye focusing at a larger included angle. Eye and neck muscle tension as described may also be reduced by changing the viewing position of the observer or the VDT. Various circumstances indicate significant difficulties, not relevant to the present invention, may be encountered with either change. Moreover, a relatively large percentage of VDT observers utilize a visual aid device referred to as eyeglasses or spectacles. It is therefore expedient and desirable to utilize the desirable characteristics of the lenses of FIGS. 1 and 2 in spectacles for VDT observers. It has been discovered that the desired characteristics of both prism lenses of FIGS. 1 and 2 may be obtained by means of a dual prism combination lens of this invention which may be employed as a part or section of each lens (i.e., slab-off) in spectacles employing a spaced pair of lenses, leaving the remainder of the lens available for usual vision correcting lens curvatures.

Figure 3:
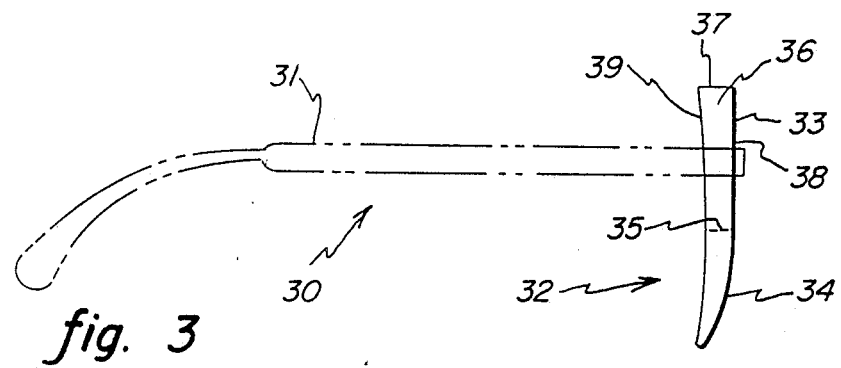
FIG. 3 is a side elevational schematic and partial cross-sectional illustration of one of a pair of spectacle lenses including a combination dual prism section in accordance with this invention.

The dual prism combination lens of this invention is referred to as a combined base-up - base-in prism. FIG. 1 illustrates a slab-off, base-up prism and FIG. 2, a base-in prism. The primary importance of the base-up prism is secondarily enhanced by the base-in prism. Both prisms may be formed in a thin single lens structure, for example, by well known lens grinding processes. FIG. 3 illustrates a cross-section of a dual prism combination lens of this invention.

Referring now to FIG. 3, spectacles 30, in a side elevational view comprise an appropriate frame member 31 shown in phantom lines which supports a transverse spaced pair of lenses 32 (only one shown). Frame member 31 is adapted to be supported by the head of a human observer so that each lens extends transversely across an eye of the observer. Lens 32 incorporates a dual prism combination lens section 33 of this invention as an upper (as viewed in FIG. 3) section of the total lens with the lower (as viewed in FIG. 3) section 34 being available as a simple plano lens section or as a section which may accommodate visual corrective lens structures or curvatures. The two sections 33 and 34 adjoin each other at a common line 35 referred to as a slab-off line, which defines the lower limit of the slab-off prism.

Lens 32 of FIG. 3 may be described as being in a generally vertical position and comprising an upper section 33 and a lower section 34. Upper section 33 comprises a base-up slab-off prism 36 which is arranged in accordance with the description for lens 10 of FIG. 1, including having its base 37 uppermost and front and back surfaces 38 and 39 converging towards slab-off line 35. Upper section 33 also includes a base-in prism as may be better described with respect to FIG. 4.

Figure 4:
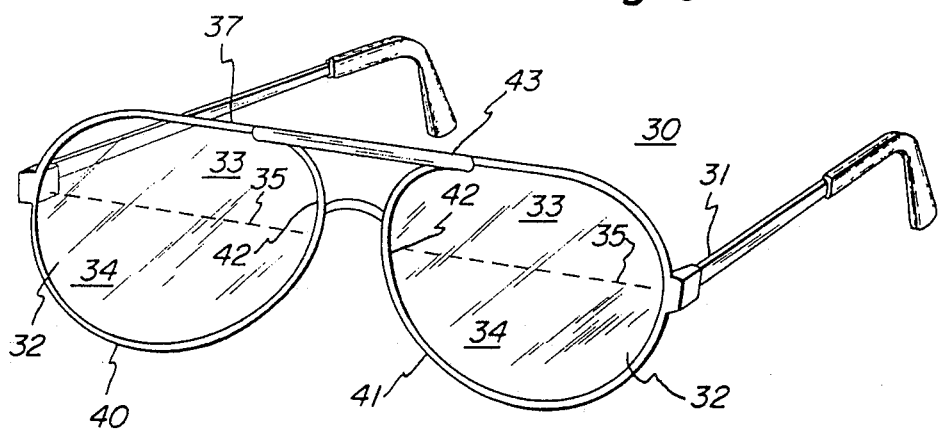
FIG. 4 is a schematic frontal perspective illustration of spectacle or frame mounted lenses of this invention.

Referring now to FIG. 4, which is a front perspective view of spectacles 30 of FIG. 3, spectacles 30 comprise a spaced pair of transverse lenses 32 retained in an appropriate frame 31 by lens encircling ribs 40 and 41. Upper sections 33 of each lens 32 include the base-up prism 36 as illustrated in FIG. 3. In FIG. 4 the thicker upper base 37 of FIG. 3 extends horizontally across the uppermost lens perimeter section. The thicker base portion for the base-in prism section is shown at 42. Base-up prism section is defined from the uppermost edge of lens 32 downwardly (FIG. 3) towards slab-off line 35. Also in FIG. 4, a base-in prism section is defined in the same section laterally from a thicker base 42 near nose piece 40 to extend oppositely across lens 32. Lens section 33 therefore becomes a dual prism combination of a thin lens section comprising base-up and base-in prisms.

Alternatively, the dual prism combination section may include the entire lens and therefore be specifically adapted for VDT viewing. Preferably, the dual prism combination section occupies only a part of the entire lens 32, an upper part 33 for example, as illustrated in FIGS. 3 and 4. It is also desirable that the remaining sections 34 of lenses 32 be unaffected by the base-up prism section so that when a VDT viewer looks down to his/her desk, over-depression of gaze is avoided. However, where the viewer needs visual assistance in the form of magnification, focusing, etc., sections 34 are available for inclusion of corrective curvatures. Bilateral focal power of the dual prism combination in each of a pair of lenses in spectacles creates optical magnification and eases ciliary muscle tension. One common need for individuals who view objects in detail is an additional lens or section of a different focal length. Such a lens section incorporated in a host section of different focus is referred to as a bifocal lens, including progressive addition lenses (no line bifocals). Where two such lens are incorporated in a host lens of different focal length the combination is referred to as a trifocal lens. The dual prism lens of this invention may incorporate bifocal and trifocal segments as illustrated in FIG. 5 showing the same general spectacle structure as FIG. 4.

Figure 5:
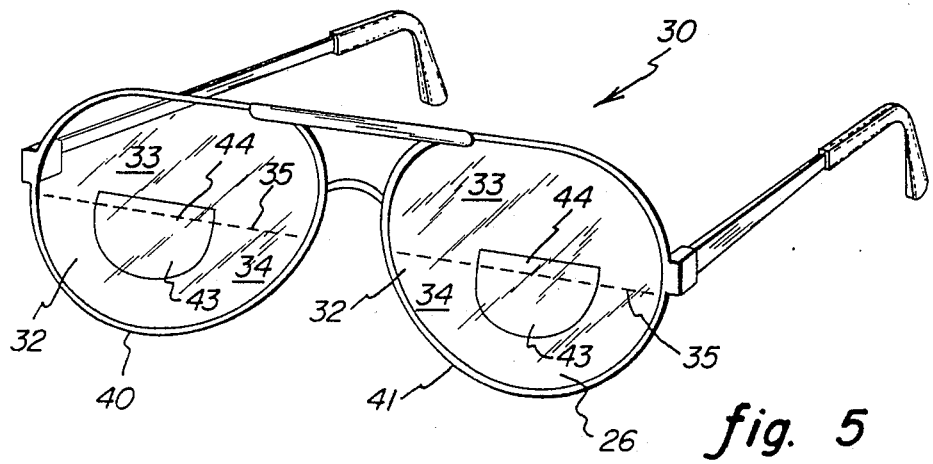
FIG. 5 is a schematic representation of spectacles mounted bifocal and trifocal lenses of this invention.

Referring now to FIG. 5, spectacles 30 include a spaced pair of lenses 32 which incorporate dual prism combination and corrective power sections 33 above slab-off lines 35 and plano or corrective lens sections 34 below slab-off lines 35. Bifocal segments 43 of the usual and well known kind are formed in lenses 32 in the usual manner such as by grinding or abrading. Bifocal lens sections 43 comprises in effect, a small and discrete lens integral with the remainder of the lens but with a focal length different from that of the remainder of the lens or lens section. The bifocal lens is defined or circumscribed by a boundary line which progresses from slab-off line 35 downwardly (FIG. 5) and laterally and arcuately to return to the slab-off line defining a somewhat circular or U-shaped area. A trifocal segment may also be added to a lens 32 which for the purpose of explanatory convenience is also included in FIG. 5.

Referring again to FIG. 5, upper sections 33 of lenses 32 include trifocal segments 44 formed therein so that slab-off line 35 becomes a common boundary for each pair of bifocal and trifocal segments in each lens 32. In this position, the trifocal segments are quite narrow and provide minimal disturbance to the dual prism combination.

As heretofore noted, the dual prism combination section may encompass the total lens as special VDT spectacles, or may be limited to an appropriate lens section leaving the remainder of the lens for other lens correction curvatures. A further modification of this invention may comprise an accessory or attachment lens structure.

An individual may wish to have the dual prism combination as only a temporary short term use for existing corrective lens spectacles. In this connection, dual prism combination lenses or sections may be provided by means of a clip-on attachment which retains a pair of lenses in the same general transverse spaced relationship as those of existing spectacles of the individual and which releaseably attach to existing spectacles to provide each lens of the existing spectacles with a dual prism combination section or lens. Such a clip-on device is illustrated in FIG. 6.

Now referring to FIG. 6, clip-on device 60 comprises a frame 61 retaining a transverse spaced pair of dual prism combination lens section 62 (only one shown) and a spring biased clamp or clip device 63. Frame 61 is pivotally jointed to clamp 63 at a pin 64 so that an individual may rotate or move a finger or thumb latch 65 to pivot the lens sections 62 to the horizontal dash line position as illustrated in FIG. 6. Clamp 63 may comprise a simple spring biased scissor action clamp, or what is often referred to as a "clothespin" clamp. FIG. 7 is a front elevational view showing the modification of FIG. 6 applied to both lenses in spectacle applications. In the clip-on device as described, the dual prism combination may encompass all or a part of the lens. In FIG. 7, the combination encompasses only an upper section of the lens. FIGS. 6 and 7 illustrate a quick releasable device for individuals who wish or need to retain their existing spectacles. Additionally, the position fixing latch device 65 permits a very rapid clearance of the dual prism combination lenses 62 away from the field of vision and a rapid reinsertion. The clip-on device is adapted to place the dual prism section in the same line of sight the observer utilizes for viewing through the spectacle lenses being covered by the clip-on device.

Any of the dual prism lenses of this invention may include a color tint to reduce glare.

As utilized herein and in the appended claims, a dual prism combination lens is a lens or section of a lens which incorporates both a base-up and a base-in prism so that when a distant and elevated object is viewed through the dual prism combination the object is perceived at a position displaced from its actual position in three dimensions, vertically lower along a longitudinal line of the object, laterally, i.e., along a lateral line or horizontal axis of the object, and at a greater distance from the observer.

The lens of this invention as shown, for example, in FIGS. 3, 4 and 5, is a thin generally circular, closed perimeter optical disc structure having a slab-off line passing therethrough and dividing said disc into a pair of viewing sections one of which is a dual prism combination (base-up and base-in prisms) section. An observer viewing an intermediate and elevated object perceives the object vertically lower, laterally displaced and at a greater distance from the observer all as compared to the actual position of the object with respect to the observer. The dual prism combination section may be limited to one section of the lens disc or occupy the full disc area in its entirety.

While this invention has been disclosed and described with respect to the preferred embodiments thereof, it will be understood by those skilled in the art that various changes and modifications may be made therein without departing from the spirit and scope of the invention as recited in the following claims.

What is claimed is:

1. An optical lens having a slab-off prism including a slab-off line passing transversely through said lens to define upper and lower viewing sections oppositely adjoining said slab-off line, and a second prism, said slab-off prism and said second prism forming a dual prism combination lens and being incorporated only in the upper viewing section.

2. The invention as recited in claim 1 wherein said dual prism combination occupies substantially all of said upper viewing section.

3. The invention as recited in claim 1 wherein the said lens is adapted to be positioned between an eye of an observer and an object to be viewed.

4. The invention as recited in claim 3 wherein said lens includes a bifocal lens section therein in said lower section thereof.

5. The invention as recited in claim 4 wherein said lens includes a trifocal lens therein in said upper section and adjoining said bifocal lens section.

6. Spectacles comprising a frame member adapted to support a transverse spaced pair of optical lenses therein to view an intermediately spaced object therethrough appearing on a VDT screen, each of said lenses having an upper section and a lower section and a dual prism combination portion occupying substantially the entire upper section of said lens, and having a width substantially equal to the width of saaidlens, said dual prism combination portion altering the view through the lens such that the object on said VDT screen viewed through said dual prism combination portion appears to be vertically lower than its true position, laterally displaced out from its true position and at a perceived greater distance.

7. The invention as recited in claim 6 wherein said dual prism combination section comprises a base-up prism—base-in prism combination.

8. A clip-on device for spectacles having a frame member retaining a transverse spaced pair of optical lenses therein specially designed for viewing a VDT screen, said clip-on device comprising in combination:
　releasably clamping means adapted to be releasably clamped to said frame member;
　a support member pivotally connected to said clamping means and retaining a transverse spaced pair of lens sections therewith; and said lens sections having dual prism combination portions therein which are positioned in planar covering spaced relationship from said optical lenses so that an intermediately spaced object on the VDT screen is viewed along the same line of sight passing through said optical lenses and said dual prism combination lens portions, each of said dual prism portions covering only an upper section of said optical lenses.

9. The invention as recited in claim 8 wherein said support member is hingedly supported from said clamping member to rotate said spaced pair of lens sections transversely away from said optical lenses.

* * * * *